Feb. 13, 1923.
G. W. STEWART
INNER LINER
Filed Apr. 12, 1920
1,445,606
Fig. 1.
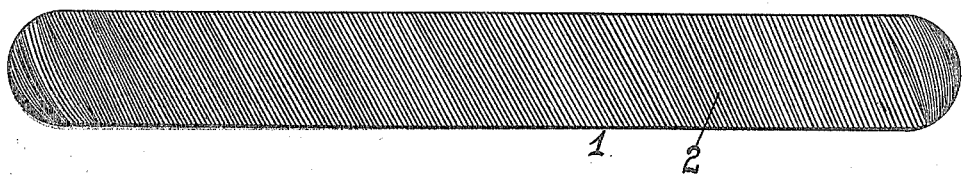
Fig. 2.
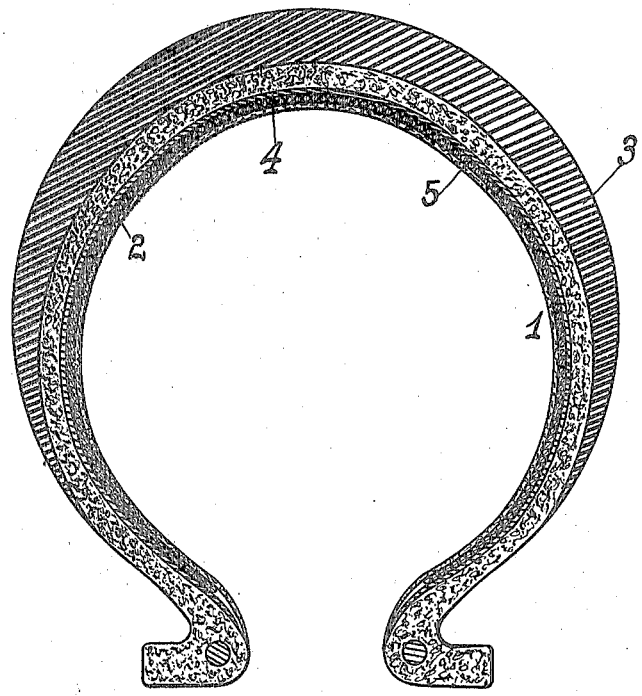
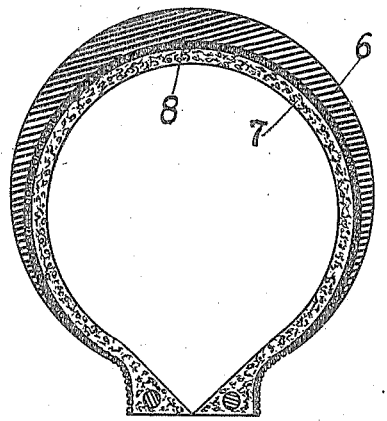
Fig. 3.
Inventor
George W. Stewart.
By Harry C. Schroeder
Attorney Patented Feb. 13, 1923.

1,445,606

UNITED STATES PATENT OFFICE.

GEORGE W. STEWART, OF ALAMEDA, CALIFORNIA.

INNER LINER.

Application filed April 12 1920. Serial No. 373,112.

*To all whom it may concern:*

Be it known that I, GEORGE W. STEWART, a citizen of the United States, residing at Alameda, in the county of Alameda and State of California, have invented certain new and useful Improvements in Inner Liners, of which the following is a specification.

The inner liners now in use are made of canvas, which cannot be molded to fit the tire. This causes the edges to curl. This irregular surface causes the inner tube to wear rapidly through and start an air leak.

The object of my invention is to provide an inner liner which may be made to exactly fit the inner surface of the tire, and of a material which gives greater resiliency.

Referring to the drawing:

Figure 1 is a plan view of my inner liner.

Figure 2 is a cross sectional view of a tire embodying my invention.

Figure 3 is a cross section of a tire showing a reinforced tread.

The numeral 1 indicates an inner liner, which is chiefly composed of cord 2, either wrapped or woven. Between the cord 2 and the inner surface of the tire 3 is a layer of rubber 4, which enables the inner liner 1 to be vulcanized to the tire 3.

A thin layer of canvas 5 covers the inner surface of the cords 2, to make a smooth bearing surface for the inner tube. The cords 2 are wrapped so that they will fit the inner surface of the tire with no irregular spots or curling.

The inner liner gives an ordinary fabric tire all of the advantages of a cord tire.

In Figure 3 after the old tread has been removed, a new tread 6 is put upon the old fabric 7 and a layer of cord 8 is placed between the tread 6 and the fabric 7. This reinforces the tread and makes a more resilient tire.

Having described my invention, I claim:

The combination with a pneumatic tire, of a liner including a body of cord, a layer of rubber between the cord and the tire casing, and a thin layer of canvas on the inside of the cord.

In testimony whereof I affix my signature.

GEORGE W. STEWART.